United States Patent [19]

Krasnov et al.

[11] Patent Number: 4,795,128
[45] Date of Patent: Jan. 3, 1989

[54] GATE TYPE KELLY COCK VALVE

[75] Inventors: Igor Krasnov, Houston; Henry D. Calk, Jr., Richmond; Taylor L. Jones, Houston; Billy L. McDougal, Missouri City, all of Tex.

[73] Assignee: Vetco Gray Inc., Houston, Tex.

[21] Appl. No.: 162,707

[22] Filed: Mar. 1, 1988

[51] Int. Cl.[4] .............................. F16K 31/122
[52] U.S. Cl. ........................... 251/62; 92/106; 92/138; 175/218; 251/58; 251/327; 251/328; 251/329; 277/27; 277/188 R
[58] Field of Search ............... 92/106, 138; 251/58, 251/62, 229, 326, 327, 328, 329; 277/27, 188 R; 175/218, 318; 166/319

[56] References Cited

U.S. PATENT DOCUMENTS

| | | | |
|---|---|---|---|
| 616,886 | 1/1899 | Brinkman | 251/62 |
| 2,386,589 | 10/1945 | Caldwell | 251/58 |
| 2,503,469 | 4/1950 | Caldwell | 251/58 |
| 2,536,565 | 1/1951 | Ostergren | 92/106 |
| 2,835,227 | 5/1958 | Gamet | 92/106 |
| 3,020,057 | 2/1962 | Gamet | 92/106 |
| 3,610,569 | 10/1971 | Reaves | 251/62 |
| 3,661,357 | 5/1972 | Armstrong, Jr. | 251/62 |
| 3,806,082 | 4/1974 | Kellner | 251/58 |
| 3,887,161 | 6/1975 | Kubelka, Jr. | 251/58 |
| 3,941,348 | 3/1976 | Mott | 251/58 |
| 4,262,693 | 4/1981 | Giebeler | 137/494 |
| 4,316,596 | 2/1982 | Krober et al. | 251/58 |
| 4,323,221 | 4/1982 | Krober et al. | 251/58 |
| 4,339,108 | 7/1982 | Daniluk | 251/58 |
| 4,456,217 | 6/1984 | Winegeart et al. | 251/58 |
| 4,576,358 | 3/1986 | Mott et al. | 251/58 |
| 4,700,924 | 10/1987 | Nelson et al. | 251/58 |

Primary Examiner—George L. Walton
Attorney, Agent, or Firm—James E. Bradley

[57] ABSTRACT

A kelly cock valve for a drill rig uses a sliding gate to open and close the flow passage through the drill string. The valve has a body with a longitudinal passage through it. The gate is mounted in the body perpendicular to the flow passage. Pushrods extend from each end of the gate out through bonnets mounted to the body of the valve. The fluid cylinders are mounted on each side of the gate. Each fluid cylinder has a piston with a piston rod extending in opposite directions. The piston rods are connected to a beam that also connects to the pushrod. Hydraulic passages supply fluid to the cylinders to stroke the piston and thus move the gate valve between open and closed positions.

3 Claims, 3 Drawing Sheets

GATE TYPE KELLY COCK VALVE

BACKGROUND OF THE INVENTION

1. Field of the Invention:

This invention relates in general to a valve for an oil well drilling rig, and in particular to a kelly cock valve that is remotely actuatable.

2. Description of the Prior Art:

In rotary well drilling, a string of drill pipe is rotated while drilling fluid is pumped down the string. In the majority of the drilling rigs, the drill string is rotated by means of a kelly, which is a square section of pipe located at the upper end of the drill string. The kelly slides through a kelly bushing in the rotary table on the rig floor. In another type, the drill string is rotated by a drive system located in the derrick.

In both types of drilling rigs, there is a need for a kelly cock valve located at the upper end of the string. This valve is remotely actuated by the driller in the event that drilling mud starts blowing up the drill pipe. This could occur in the event that a high pressure zone is encountered.

The known kelly cock valves employ a tubular body mounted to the kelly or the uppermost section of pipe in the drill string. A ball valve is located in the body for opening and closing the drill pipe. Fluid pressure applied to an actuator causes the ball valve to open and close.

Some of the types use a fluid collector or swivel for transmitting pneumatic or hydraulic fluid from stationary lines to fluid pistons and cylinders in the body which rotate with the body. Others employ stationary fluid pistons and cylinders located above the rotating body. These include means for transmitting linear movement from the stationary actuator to the components of the valve.

While these systems are workable, improvements are desirable. Particularly desirable would be a kelly cock that would enable repair and maintenance on the valve without needing to break out the valve body from the kelly in each case. Also, a valve that is well balanced is desirable. If not well balanced, the rotating components tend to cause vibration.

SUMMARY OF THE INVENTION

The kelly cock valve of this invention is a gate type valve, rather than a ball valve. The valve has a body that connects into the string of drill pipe. Upper and lower valve seats are mounted in a flow passage in the body. A gate is mounted transverse to the flow passage of the drill string and located slidingly between the seats.

Pushrods extend from each end of the gate through bonnets mounted to the tubular body. Fluid cylinders are mounted on each side of the gate. Each fluid cylinder has a piston rod extending out each end. A beam or yoke connects the ends of the piston rods and also the pushrod. The fluid cylinders are mounted diagonally relative to the gate, one located above, and one located below, and each to one side.

Hydraulic fluid passages extend through the body which supply fluid to the fluid cylinders. Swivel means located on the upper end of the fluid body transmits hydraulic fluid from stationary lines into the hydraulic passages.

DETAILED DESCRIPTION OF THE INVENTION

Figure 1:
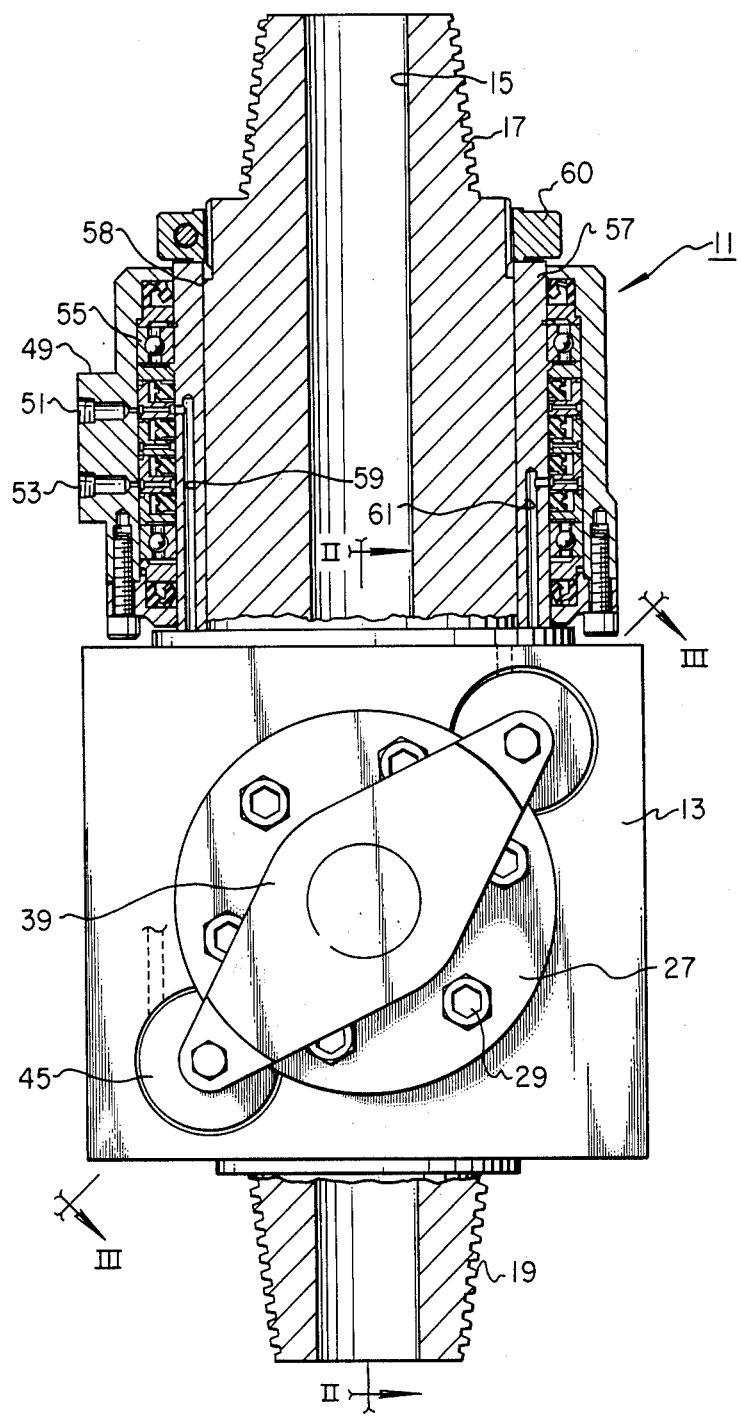
FIG. 1 is a side view, partially sectioned, of a kelly cock valve constructed in accordance with this invention.

With reference now to the figures and in particular with reference to FIG. 1, the kelly cock assembly 11 has a body 13. Body 13 has a longitudinal flow passage 15 that extends through it. The upper and lower ends 17, 19, of body 13 are threaded for connecting to the top of a kelly (not shown) or uppermost section of a string of drill pipe (not shown). Body 13 rotates with the drill pipe.

Figure 2:
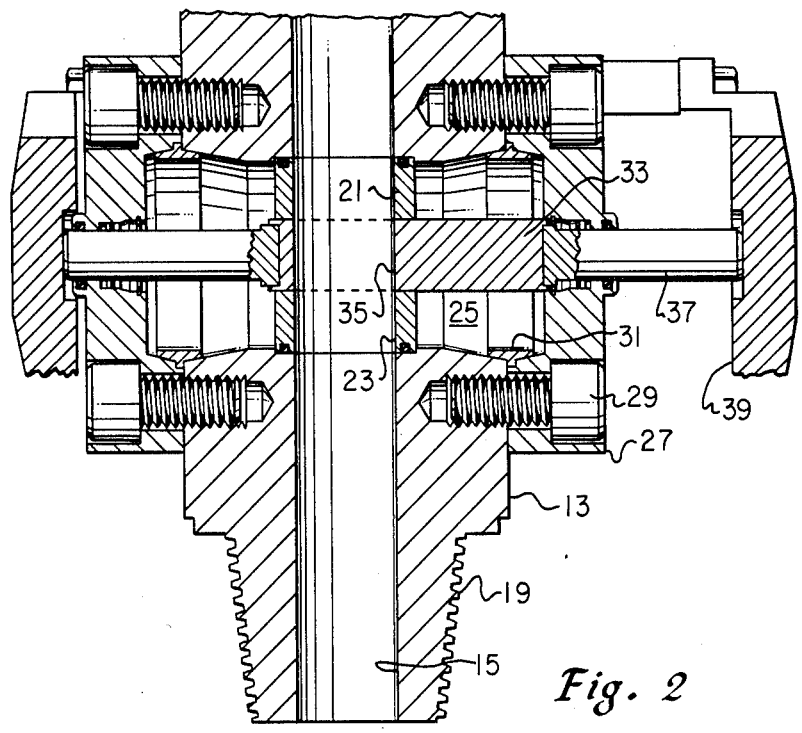
FIG. 2 is a sectional view of the valve of FIG. 1, taken along the line II—II of FIG. 1.

Referring to FIG. 2, upper and lower seats 21, 23, are mounted in a chamber 25 located in the body 13. Each seat 21, 23 is a circular ring with an aperture that aligns with the flow passage 15. The seats 21, 23, are spaced vertically apart from each other. The chamber 25 extends perpendicular to the flow passage 15. The chamber 25 is closed on each side by a bonnet 27. Each bonnet 27 is bolted to a flat side of the tubular body 13 by means of bolts 29 (FIG. 1). A metal seal 31 seals each bonnet 27 to the body 13 to prevent leakage from the chamber 25.

A gate 33 is carried in the chamber 25. Gate 33 fits slidingly between the seats 21, 23. Gate 33 is flat on each side and is perpendicular to the longitudinal axis of the flow passage 15. Gate 33 has a port 35 near one end. Gate 33 will move between a closed position and an open position with the port 35 aligned with the flow passage 15 and the seats 21, 23. In the closed position, the flow passage 15 is blocked by the gate 33.

A pushrod 37 extends laterally out from each end of the gate 33. Each pushrod 37 extends slidingly and sealingly through a passage in each bonnet 27. A beam 39 is connected to the end of each pushrod 37.

Figure 3:
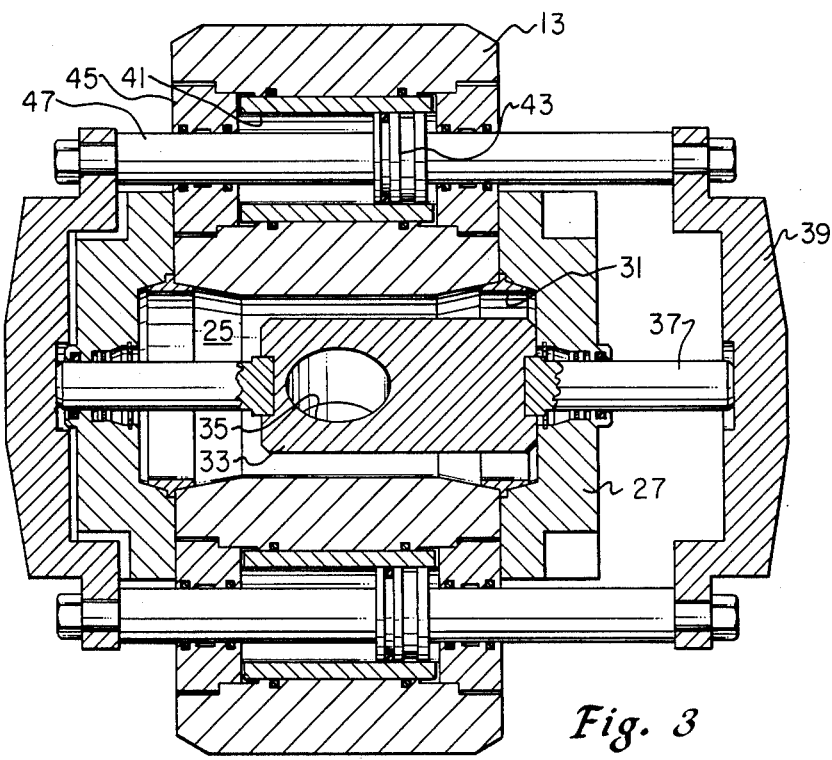
FIG. 3 is a sectional view of the valve of FIG. 1, taken along the line III—III of FIG. 1.

Referring to FIG. 3, each beam 39 extends transversely in opposite directions from the pushrods 37. As shown in FIG. 1, each beam 39 is somewhat diamond shaped and is oriented diagonally relative to the flow passage 15. Preferably, the beam 39 inclines at a forty-five degree angle relative to the longitudinal axis of the flow passage 15.

Referring again to FIG. 3, a fluid cylinder 41 is located on each side of the gate 33. Each fluid cylinder 41 is mounted in the body 13. Note, as shown in FIG. 3, that the body 13 has a rectangular portion with a greater width measured from one side to the other side than between the flat faces to which the bonnets 27 are attached. A piston 43 is carried reciprocally in each cylinder 41. A gland 45 on each end of the cylinders 41 creates a closed chamber for each piston 43.

Each piston 43 is double acting, with a piston rod 47 extending laterally outward in opposite directions from the piston 43. The outer end of each piston rod 47 is secured to one end of each beam 39. This locates the pushrod 37 between the piston rods 47 and in the same plane as the piston rods 47. The fluid cylinders 41 are located diagonally in the valve body 13. One is located above and to one side of the gate 33. The other is located below and to the other side of the gate 33. This is best shown in FIG. 1 by reference to the glands 45.

Referring still to FIG. 1, the hydraulic system for supplying fluid to the fluid cylinders 41 (FIG. 3) includes a housing 49 mounted above the bonnets 27. The housing 49 does not rotate. Ports 51 and 53 extend to housing 49 and are connected to lines (not shown) that are stationary on the drill rig. Upper and lower bearings 55 allow the housing 49 to remain stationary as the body 13 rotates. A sleeve 57 is mounted to a neck 58 of the body 13. The neck 58 is cylindrical. Dowels (not shown) are connected between the sleeve 57 and the neck 58 to cause the sleeve 57 to rotate with the neck 58. The sleeve 57 will slide over the neck 58 and is secured by a nut 60 on the upper end.

Two hydraulic passages 59, 61 extend downward through the sleeve 57. Hydraulic passage 59 leads to one end of each cylinder 41 (FIG. 3). Hydraulic passage 61 leads to the opposite end of each cylinder 41.

Figure 4:
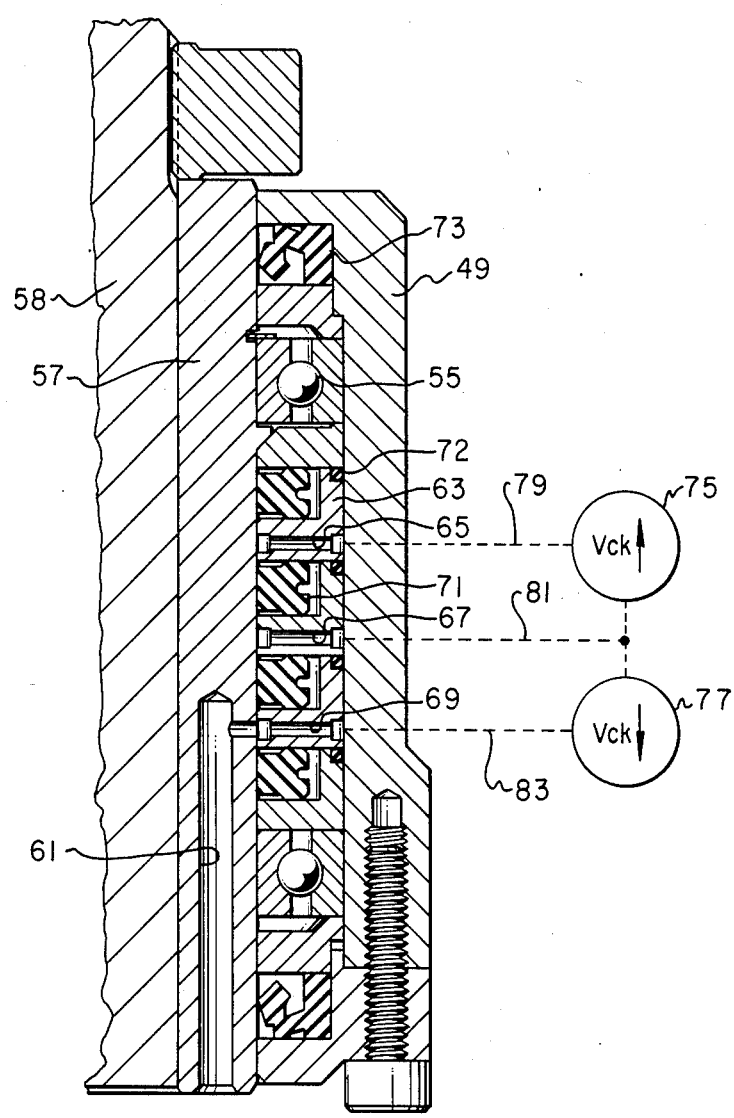
FIG. 4 is an enlarged sectional view illustrating the hydraulic swivel assembly for the valve of FIG. 1.

As shown in more detail in FIG. 4, manifolds 63 are located between the sleeve 57 and the housing 49 for transmitting hydraulic fluid between the port 51 and passage 59, and between the port 53 and the passage 61. Each manifold 63 is an L-shaped ring. Three of the manifolds 63 are employed. One manifold 63 has a passage 65, another has a passage 67, and the third manifold has a passage 69. Annular grooves are contained on the inner diameter and the outer diameter of each manifold 63 in communication with the passages 65, 67, and 69. The upper manifold passage 65 leads to the hydraulic passage 59. The lower manifold passage 69 leads to the hydraulic passage 61. The central manifold passage 69 is not directly connected to either hydraulic passage 59 or 61.

Four high pressure seals 71 locate between the manifolds 63 and the sleeve 57. The manifolds 63 are stationary with the housing 49. O-ring seals 72 seal each manifold 63 to the housing 49. The high pressure seals 71 are a type that loosely engage the rotating sleeve 57 until actuated by fluid pressure. When actuated by fluid pressure, they will tightly bear against the sleeve 57. Low pressure seals 73 are located at the upper and lower ends of the housing 49 above the bearings 55.

Two check valves 75 and 77 are shown schematically, but in actual practice, will be mounted stationarily to the housing 49. Check valve 75 is connected to the upper manifold passage 65 by a passage 79. A passage 81 connects the junction of the check valves 75, 77, to the central manifold passage 67. A passage 83 connects the check valve 77 to the lower manifold passage 69. Check valve 75 is oriented to prevent any flow from the uppermost manifold passage 65 to the check valve 75, but allow flow from the central manifold passage 67 back through the passage 79. Similarly, check valve 77 prevents flow from the lower manifold passage 69, but allows flow from the middle manifold passage 67 into the lower manifold passage 69.

In operation, when it is desired to close the gate 33 (FIGS. 2 and 3), the driller closes a valve, (not shown) to apply hydraulic pressure to the lower manifold passage 69, shown in FIG. 4. The seals 71 will not begin to seal until the pressure against them is up to a certain amount, for example 100-200 psi (pounds per square inch). Consequently, initially some of the fluid will flow out the passage 69 into the spaces surrounding the two lower seals 71 on each side. This initial flow will also flow into the central manifold passage 67 and into line 81. From line 81, the fluid will flow through the check valve 75 and into line 79 and the upper manifold passage 65. From the upper manifold passage 65 the initial flow will flow into the reservoir (not shown) through the upper port 51 (FIG. 1).

Once the pressure reaches a sufficient amount to energize the two lowermost seals 71, then they will stop leaking any fluid into the central manifold passage 67. The hydraulic pressure will cause the pistons 43 to move to the left, as shown in FIG. 3. The pistons 43 will move the beams 39, causing the gate 33 to move to a closed position.

As the gate 33 moves to the closed position, return fluid on the opposite sides of the pistons 43 passes through the passage 61 to the port 51, as shown in FIG. 1. Initially, the upper seals 71 (FIG. 4) will not be actuated, therefore, the return fluid will flow around the upper seals 71 and into the central manifold passage 67 to the line 81. The fluid flows through the check valve 75 and the passage 79 into the upper manifold passage 65 and to the port 51. The return flow flows to the storage reservoir (not shown). Once the return pressure reaches the amount needed to actuate the upper seals 71, flow will cease through the central manifold passage 67. All of the return flow will flow through the upper manifold passage 65 to the port 51.

When it is desired to open the gate 33, hydraulic pressure is applied in the opposite direction. The hydraulic fluid will proceed through the port 51 (FIG. 1) to the left side of the pistons 43. The seals 71 will seal and the check valves 75, 77, will operate in the same manner as described, but in reverse sequence.

The invention has significant advantages. The gate valve is easily accessible for repair. The gate and the internal components can be removed by loosening the bolts to the bonnet. It is not necessary to breakout the body of the valve from the kelly. Having pistons on each side of the gate valve which are double acting, and yokes or beams on opposite sides, provides good balance for the rotating components.

While the invention has been shown in only one of its forms, it should be apparent to those skilled in the art that it is not so limited, but is susceptible to various changes without departing from the scope of the invention.

We claim:

1. A valve for controlling fluid flow through a string of drill pipe, comprising in combination:

a body having a longitudinal flow passage therethrough and threaded upper and lower ends for connection into the string of drill pipe for rotation with the drill pipe;

upper and lower valve seats mounted in the body vertically spaced apart from each other, each having a port aligned with the flow passage;

a gate having ends on opposite sides and carried in the body perpendicular to the flow passage in sliding engagement with the seats, the gate being slidable transverse to the flow passage between an open position for allowing fluid flow through the flow passage, and a closed position blocking flow through the flow passage;

an opening on each side of the body adjacent one end of the gate;

a pair of bonnets, each releaseably secured to one of the openings;

a pair of pushrods, each having an inner end connected to said one end of the gate and an outer end extending laterally outward from the gate sealingly through one of the bonnets;

at least one fluid cylinder mounted to the body perpendicular to the flow passage and alongside the gate;

at least one piston reciprocally carried in the fluid cylinder, and having a pair of piston rods, each with an outer end extending therefrom in opposite directions parallel to the pushrods;

a pair of beams externally connected between the outer ends of the pushrods and the piston rods to cause the pushrods to move in unison with the piston rods;

operating fluid passage means extending to the cylinder for stroking the piston to selectively move the gate between the open and closed positions; and swivel means mounted to the body, connected to a fluid line for receiving pressurized operating fluid, and for delivering the operating fluid to the operating fluid passage means, the body being rotatable relative to the swivel means for allowing the body to rotate in unison with the drill pipe.

2. A valve for controlling fluid flow through a string of drill pipe, comprising in combination:

a body having a longitudinal flow passage therethrough and threaded upper and lower ends for connection into the string of drill pipe for rotation with the drill pipe;

upper and lower valve seats mounted in the body vertically spaced apart from each other, each having a port aligned with the flow passage;

a gate having ends on opposite sides and carried in the body perpendicular to the flow passage in sliding engagement with the seats, the gate having an aperture therethrough and being slidable transverse to the flow passage between an open position with the aperture in alignment with the seats for allowing fluid flow through the flow passage, and a closed position blocking flow through the flow passage;

a pair of openings, each on an opposite side of the body from the ends of the gate;

a bonnet releaseably secured to each opening;

a pair of pushrods, each having an inner end connected to one end of the gate and an outer end extending laterally outward from the gate in opposite directions sealingly through each of the bonnets;

a pair of fluid cylinders, each mounted to the body perpendicular to the flow passage and with the gate located therebetween;

a piston reciprocally carried in each of the fluid cylinders, each piston having a pair of piston rods, each with an outer end extending outward from the piston in opposite directions, each piston rod being parallel to each of the pushrods, each of the pushrods being located between two of the piston rods;

a pair of beams, each externally connected between the outer ends of the pushrods and the piston rods on each side of the gate to cause the pushrods to move in unison with the piston rods;

operating fluid passage means extending to the cylinders on each side of the pistons for stroking the pistons to selectively open and close the gate; and swivel means mounted to the body, connected to a fluid line for receiving pressurized operating fluid, and for delivering the operating fluid to the operating fluid passage means, the body being rotatable relative to the swivel means for allowing the body to rotate in unison with the drill pipe.

3. A valve for controlling fluid flow through a string of drill pipe, comprising in combination:

a body having a longitudinal flow passage therethrough and threaded upper and lower ends for connection into the string of drill pipe for rotation with the drill pipe;

upper and lower valve seats mounted in the body vertically spaced apart from each other, each having a port aligned with the flow passage;

a gate having ends on opposite sides and carried in the body perpendicular to the flow passage in sliding engagement with the seats, the gate having an aperture therethrough and being slidable transverse to the flow passage between an open position with the aperture in alignment with the seats for allowing fluid flow through the flow passage, and a closed position blocking flow through the flow passage;

a pair of openings, each on an opposite side of the body from the ends of the gate;

a bonnet releaseably secured to each opening;

a pair of pushrods, each having an inner end connected to one end of the gate and an outer end extending laterally outward from the gate in opposite directions and sealingly through the bonnet;

a pair of fluid cylinders, each mounted to the body perpendicular to the flow passage and with the gate located therebetween, one of the fluid cylinders being located above a plane containing the gate, and the other of the fluid cylinders being located below a plane containing the gate;

a piston reciprocally carried in each of the fluid cylinders, each piston having a pair of piston rods, each with an outer end extending outward from the piston in opposite directions, each piston rod being parallel to each of the pushrods, each of the pushrods being located between two of the piston rods;

a pair of beams, each externally connected between the outer ends of the pushrods and the piston rods on each side of the gate to cause the pushrods to move in unison with the piston rods, each beam extending diagonally relative to the flow passage;

operating fluid passage means extending to the cylinders on each side of the pistons for stroking the pistons to selectively open and close the gate; and swivel means mounted to the body, connected to a fluid line for receiving pressurized operating fluid, and for delivering the operating fluid to the operating fluid passage means, the body being rotatable relative to the swivel means for allowing the body to rotate in unison with the drill pipe.

* * * * *